United States Patent
Williamson

[11] Patent Number: 6,116,536
[45] Date of Patent: Sep. 12, 2000

[54] FREQUENCY ADJUSTING ARRANGEMENT

[75] Inventor: James Williamson, Franklin, Mass.

[73] Assignee: Raytheon Company, Lexington, Mass.

[21] Appl. No.: 05/879,580

[22] Filed: Feb. 16, 1978

[51] Int. Cl.[7] .............................. F41G 7/00; H01Q 1/28; G01S 13/00

[52] U.S. Cl. .................... 244/3.14; 343/708; 343/756; 342/62

[58] Field of Search ................. 343/7 A, 17.2, 343/17.5, 708, 756; 244/3.14; 325/419; 342/62

[56] References Cited

U.S. PATENT DOCUMENTS

| | | | |
|---|---|---|---|
| 3,720,941 | 3/1973 | Ares ........................................ | 343/7 A |
| 3,893,113 | 7/1975 | Iten et al. ................................ | 343/7 A |
| 3,909,735 | 9/1975 | Anderson et al. ...................... | 325/419 |
| 3,938,148 | 2/1976 | Hobson .................................. | 343/7 A |
| 3,953,849 | 4/1976 | Couvillon .............................. | 343/7 A |
| 3,979,748 | 9/1976 | Gellekink ........................ | 343/17.2 PC |
| 4,011,564 | 3/1977 | Gulick, Jr. .............................. | 343/7 A |
| 4,048,566 | 9/1977 | Carson et al. ......................... | 325/419 |
| 4,067,013 | 1/1978 | Smith ..................................... | 343/7 A |
| 4,100,545 | 7/1978 | Tabourier .............................. | 343/7 A |

Primary Examiner—Peter A. Nelson
Assistant Examiner—Thomas H. Webb
Attorney, Agent, or Firm—Glenn H. Lenzen, Jr.

[57] ABSTRACT

Circuitry for adjusting the resonant frequency of an Yttrium-Iron-Garnet (YIG) filter in the first local oscillator of a receiver carried on a guided missile is shown to include the combination of a crystal oscillator which produces a pilot signal for tuning the YIG filter to a corresponding resonant frequency and a frequency adjusting arrangement for offsetting the resonant frequency of the YIG filter by a predetermined amount.

2 Claims, 2 Drawing Sheets

FREQUENCY ADJUSTING ARRANGEMENT

The invention herein described was made in the course of, or under a contract or subcontract thereunder, with the Department of the Navy.

BACKGROUND OF THE INVENTION

This invention pertains generally to semiactive guidance control systems for guided missiles and particularly to a system of such kind in which the operating frequency of a reference oscillator in a guided missile during flight is controlled to maintain coherence between such operating frequency and the frequency of a control radar.

It is known in the art, as shown in the now pending U.S. patent application, Ser. No. 579,281, entitled "Adaptive Semiactive Missile Guidance System and Elements Therefor," and assigned to the same assignee as this application, that an electronically tunable arrangement may be used in a guided missile to maintain coherence between the operating frequency of a reference oscillator in such missile during flight and the frequency of a control radar. As described in detail in that application, the electronically tunable arrangement includes an Yttrium-Iron-Garnet (or YIG) filter as the frequency determining element for the reference oscillator. Briefly, in the referenced arrangement, portions of the output signal from a voltage-controlled oscillator (the first local oscillator) are passed through a YIG filter and a passive phase shifter to the input terminals of a phase detector. The signal out of such detector, then, is indicative of the difference between the frequency of the output signal of the voltage controlled oscillator (the first local oscillator signal) and the resonant frequency of the YIG filter. The signal out of the phase detector then, after appropriate shaping, is applied to the voltage controlled oscillator to force the frequency of the output signal from that element into coincidence with the resonant frequency of the YIG filter.

In order to tune the voltage controlled oscillator to the proper frequency with respect to the frequency of the radar signal from the control radar when the guided missile is launched, the resonant frequency of the YIG filter is changed in a programmed manner until an output signal is produced by the rear receiver. Unfortunately, however, when more than one control radar is being operated in the vicinity (as when a guided missile is launched from one aircraft in a formation) of the launching point of a guided missile, the programmed change in the resonant frequency of the YIG filter may cause an output signal to be produced when the radar signal in the rear receiver is from the wrong control radar. The guided missile, then, either is directed toward a target selected by the wrong radar or control of such missile is lost.

SUMMARY OF THE INVENTION

With the foregoing in mind, it is a primary object of this invention to provide an improved arrangement for tuning, during the initial stage of such a missile, the rear receiver in a guided missile to radar signals from the proper control radar.

Another object of this invention is to provide an improved arrangement for preventing radar signals from other than the proper radar from affecting the tuning of the rear receiver in a guided missile.

The foregoing and other objects of this invention are generally attained by providing, in order to tune the YIG filter in the rear receiver of a guided missile during the initial stage of flight, a pilot signal from a crystal oscillator and a frequency offset signal. The pilot signal is processed in the same manner as if it were the radar signal from the control radar to tune the YIG filter to a predetermined frequency and the frequency offset signal is used to change the resonant frequency of the YIG filter to correspond generally with the frequency of the radar signal from the control radar. Once this is accomplished, the pilot signal is removed and the resonant frequency of the YIG filter is slightly adjusted if necessary in a programmed manner to detect and track only the radar signal from the proper control radar.

BRIEF DESCRIPTION OF THE DRAWINGS

For a more complete understanding of this invention reference is now made to the following description of the accompanying drawings, wherein.

DESCRIPTION OF THE PREFERRED EMBODIMENT

Figure 1:
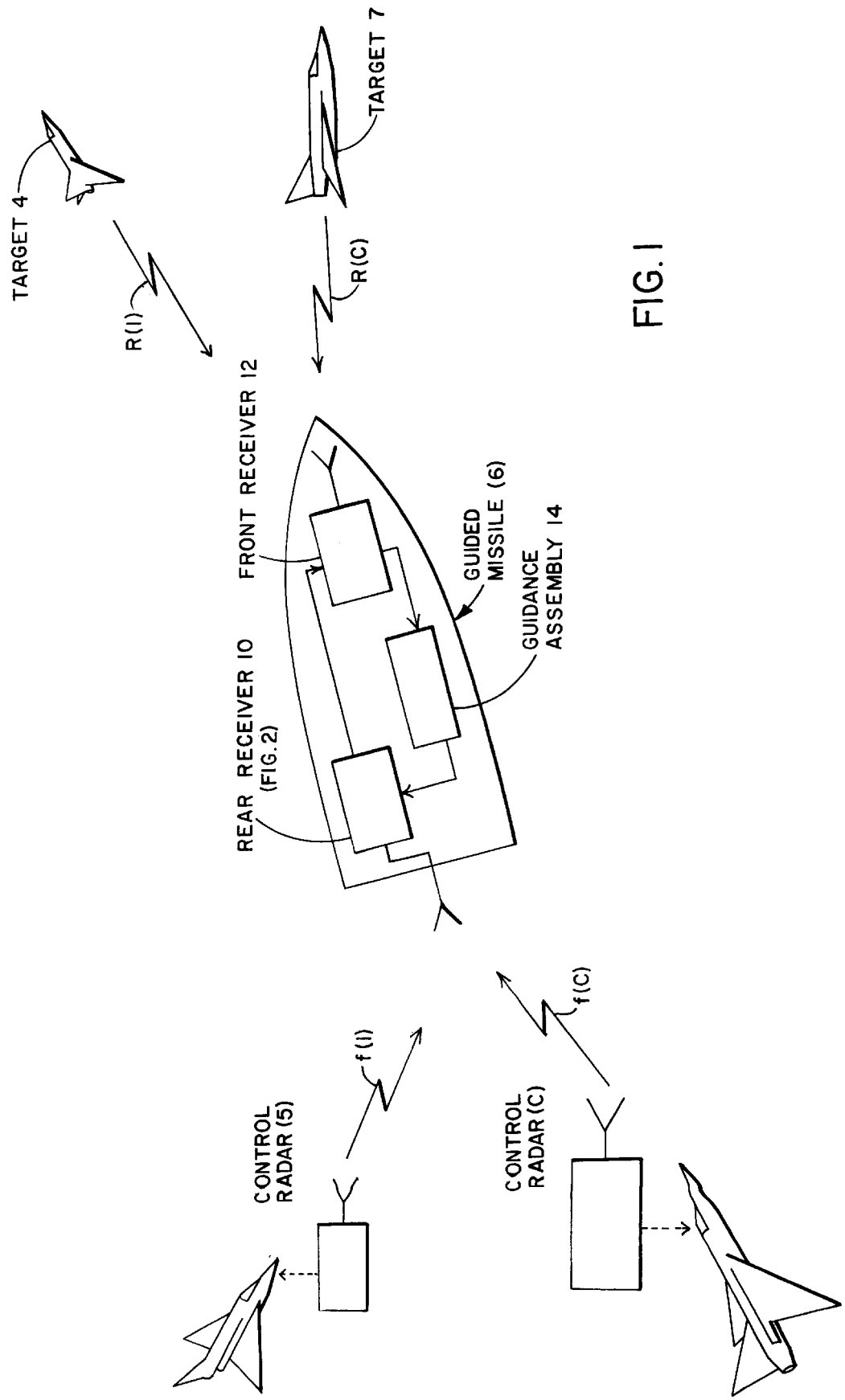
FIG. 1 is a sketch showing an exemplary tactical situation wherein a guided missile has been launched from a mother aircraft toward a selected target.

Before referring to the drawings in detail, it should be noted that the present invention is intended to be added to the rear receiver and first local oscillator control circuitry shown and described in the copending application entitled "Adaptive Semiactive Missile Guidance System and Elements Therefor" referred to hereinbefore. For the sake of brevity, then, the portions of that application which are necessary to an understanding of this invention are here shown in less detail than in the referenced application, it being understood that signal processing to derive the logical signals for acquiring and tracking the radar signal from the control radar and the echo signal from the selected target are here (except as noted) the same as described in the referenced application.

With the foregoing in mind, reference is now made to FIG. 1 where a control radar (C) in a semiactive guidance system is shown simultaneously to illuminate a target, 4, and a guided missile, 6, in flight. Such missile carries a rear receiver 10, a front receiver 12 and a guidance assembly 14. The radar signal, f(C), from the control radar (C) is received directly by the rear receiver 10. An echo signal R(C) from the target 4 is received by the front receiver 12. In the absence of any interfering signal, then, the front and rear receivers 12, 10 may be properly tuned so that the echo signal, after processing in the front receiver 12, would provide the proper input signals to the guidance assembly 14. The latter assembly would, therefore, in turn provide guidance command signals to the control surfaces (not shown) of the guided missile 6.

In the illustrated situation, however, a radar signal f(l) from a control radar 5 tracking a target 7 is also received by the rear receiver 10. Such radar signal differs in frequency from the radar signal f(C). Therefore, when the rear receiver 10 is tuned in a programmed manner to acquire the radar signal f(C) from the control radar (C), it could mistakenly acquire and, for some period of time at least, lock on the radar signal f(l). It will be obvious if that happens that control of the guided missile 6 by the control radar (C) is lost. At best then control of the guided missile 6 may be unknowingly assumed by control radar S.

Figure 2:
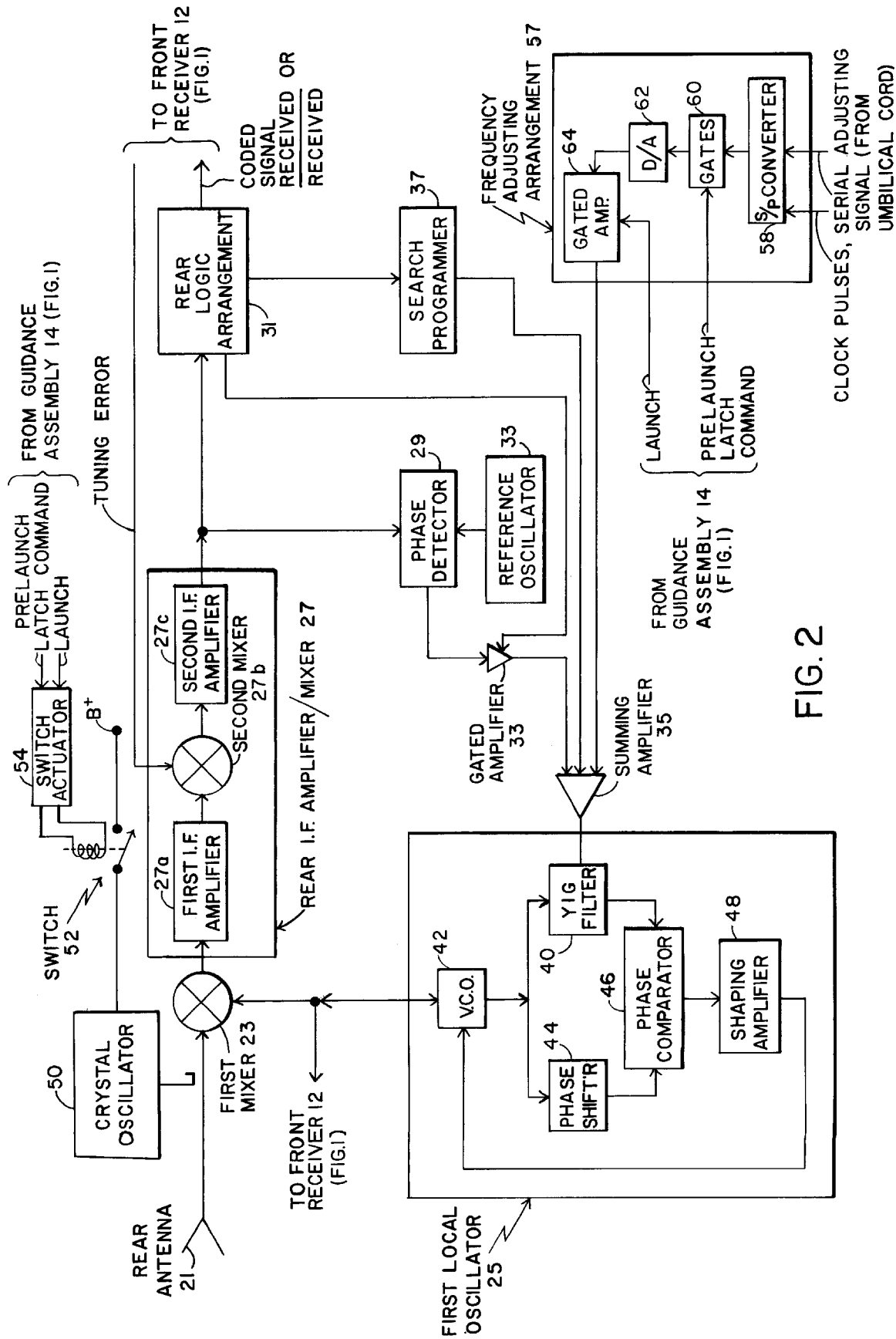
FIG. 2 is a block diagram, somewhat simplified, showing how the resonant frequency of a YIG filter in the guided missile shown in FIG. 1 is tuned so that only the radar signal from the mother aircraft may be detected.

Referring now to FIG. 2 it will be observed that the greater part of the illustrated arrangement is the same as the rear receiver shown in the referenced application. Thus, a rear antenna 21 is shown to be connected to a first mixer 23 along with a first local oscillator signal from a first local oscillator 25. The resulting intermediate frequency (I.F.) signal is passed through a rear I.F. amplifier/mixer 27 (which includes a first I.F. amplifier section 27a, a second mixer 27b and a second amplifier section 27c) to a phase detector 29 and to a rear logic arrangement 31. The second input to the second mixer 27b is a signal from the front receiver 12 (FIG. 1) indicative of the tuning error of that receiver. The second input to the phase detector 29 is taken from a reference oscillator 33. As described in the referenced application, the rear logic arrangement 31 is responsive to the output of the I.F. amplifier 27 to provide signals indicative of whether or not a properly coded signal is being received by the rear antenna 21 and to command operation accordingly. Thus, if a properly coded signal is present, the rear logic arrangement 31 is operative to gate on a gated amplifier 34 to allow the output signal from the phase detector 29 to be passed (via a sample and hold circuit, not shown) through a summing amplifier 35. The rear logic arrangement 31 is then also operative to pass a signal indicating that a properly coded signal is being received to the front receiver 12 (FIG. 1). Alternatively, if no properly coded signal is at the output of the I.F. amplifier 27, the rear logic arrangement is operative to actuate a search programmer 37 which provides, in a programmed manner, different levels of voltage to the summing amplifier 35.

The output of the summing amplifier 35 is applied (via a driver circuit, not shown) as a tuning signal to a YIG filter 40 incorporated as the tuning element of the first local oscillator 25. The latter, as indicated, consists of (in addition to the YIG filter 40) a voltage controlled oscillator (V.C.O. 42), a phase shifter 44, a phase comparator 46 and a shaping amplifier 48. The output of the V.C.O. 42 is the first local oscillator signal applied to the first mixer 23 and to the front receiver 12 (FIG. 1). It will now be apparent that the frequency of the output of the V.C.O. 42 is driven into coincidence with the resonant frequency of the YIG filter 40 and that that resonant frequency is determined by the output of the summing amplifier 35.

A crystal oscillator 50 is coupled in any convenient manner as shown to one input of the first mixer 23. The crystal oscillator 50 is connected, through a switch 52 controlled by a switch actuator 54, to a power source, B+. That actuator (which may be a conventional multivibrator) is, as indicated, controlled by a "PRELAUNCH LATCH COMMAND" signal and a "LAUNCH" signal from the guidance assembly 14 (FIG. 1) to cause the switch 52 to be closed for a short period of time before launch of the guided missile 6 (FIG. 1). During the time the switch 52 is closed, the crystal oscillator 50 is energized to pass a pilot signal of frequency, f, to the first mixer 23. Whatever the frequency of the V.C.O. 42 at the time the switch 52 closes, the intermediate frequency signal then produced is applied to the rear I.F. amplifier 27. The rear logic arrangement 31 then responds (usually by actuating the search programmer 37) to cause the resonant frequency of the YIG filter 40 to be adjusted until the frequency of the V.C.O. 42 is offset from the frequency of the crystal oscillator 50 by the proper amount to allow a pilot signal to pass through the rear I.F. amplifier 27. The output of the phase detector 29 is then passed, through the gated amplifier 34, to the summing amplifier 35 to finely adjust the resonant frequency of the YIG filter 40.

It will now be appreciated that, if the frequency of the crystal oscillator 50 is the same as the frequency f(C) of the control radar (C) (FIG. 1), the just described operation will result in the frequency of the V.C.O. 42 being offset by the intermediate frequency from the frequency f(C). Although such a correlation would be ideal, practical considerations make it difficult to achieve. In the first place, the frequencies of the crystal oscillator 50 and the control radar (C) (FIG. 1) would have to be closely controlled. In the second place, once the guided missile 6 (FIG. 1) is launched, provision must be made to compensate for the Doppler shift due to relative motion between the guided missile 6 and the control radar (C). It is, therefore, necessary here only that the frequency of the crystal oscillator 50 be within, say, ±125 MHz of the frequency of the control radar (C) (FIG. 1). Then, when the resonant frequency of the YIG filter 40 is forced into coincidence with the frequency of the crystal oscilllator 50, any initially existing error (due to a change in ambient temperature of any other factor) in the first local oscillator 25 will essentially have been eliminated.

A frequency adjusting arrangement 57 is provided finally to force the resonant frequency of the YIG filter 40 to a frequency approximating the frequency which the first local oscillator 25 should have with respect to the frequency of the control radar (C) (FIG. 1). It will be observed that, prior to launch of the guided missile 6 (FIG. 1), the difference between the frequency of the crystal oscillator 50 and the control radar (C) (FIG. 1) may be determined in any convenient way (not shown) to produce a serial adjusting signal passed to the frequency adjusting arrangement 56 over the umbilical cord (not shown). Such serial adjusting signal is passed to a serial-to-parallel converter (S/P converter 58) which may be a register. When the guided missile 6 is launched, the contents of the S/P converter 58 are passed through gates 60 to a digital-to-analog converter (D/A 62) and then through a gated amplifier 64, thereby to provide, via the summing amplifier 35, a frequency adjusting signal to the YIG filter 40. The frequency adjusting signal is such that the resonant frequency of the YIG filter 40 is forced finally to, approximately, the correct frequency for the first local oscillator 25. Thus, even if the frequency of the first local oscillator 25 is not quite properly set to allow immediate detection of the radar signal from the control radar (C) (FIG. 1) at "LAUNCH+400 MILLISECONDS", the operation of the search programmer 37 will change the frequency of the first local oscillator 25 to cause the radar signal from the control radar (C) to be detected without allowing any interfering signal (as from the control radar 5) (FIG. 1) to be detected.

Having described the preferred embodiment of this invention, it will now be apparent to one of skill in the art that many changes may be made without departing from the inventive concepts. It is felt, therefore, that this invention should not be restricted to its disclosed embodiment but rather should be limited only by the spirit and scope of the appended claims.

What is claimed is:

1. In a radar receiver wherein the frequency of the first local oscillator corresponds with the resonant frequency of an Yttrium-Iron-Garnet (YIG) filter, circuitry for adjusting such resonant frequency to a frequency offset by a predetermined amount from the frequency of a control radar, such circuitry comprising:

(a) a crystal oscillator for producing a pilot signal at a frequency approximating the frequency of the control radar and applying such pilot signal to the radar receiver;

(b) means for detecting the pilot signal to form a control signal and for applying such control signal to a YIG filter to adjust the resonant frequency of the YIG filter to a frequency offset by a predetermined amount from the frequency of the pilot signal; and (c) means for forming a frequency adjusting signal having a value proportional to the difference between the frequencies of the crystal oscillator and the control radar and for applying such frequency adjusting signal to the YIG filter along with the control signal.

2. In a radar receiver as in claim 1, such radar receiver being installed in a guided missile and the control radar being installed in a mother aircraft, wherein the circuitry comprises, additionally:

(a) means for actuating the crystal oscillator only for an interval of time immediately prior to launch of the guided missile; and (b) means for actuating the frequency adjusting signal forming means only when the guided missile is launched.

* * * * *